United States Patent
Wolff et al.

(10) Patent No.: US 7,550,938 B2
(45) Date of Patent: Jun. 23, 2009

(54) MECHANICAL-ELECTRONIC POSITION SENSOR

(75) Inventors: Bernd Wolff, Hennef (DE); Guido Voellmar, Cologne (DE)

(73) Assignee: Moeller GmbH, Bonn (DE)

( * ) Notice: Subject to any disclaimer, the term of this patent is extended or adjusted under 35 U.S.C. 154(b) by 988 days.

(21) Appl. No.: 11/105,983

(22) Filed: Apr. 14, 2005

(65) Prior Publication Data

US 2005/0268179 A1 Dec. 1, 2005

(30) Foreign Application Priority Data

Apr. 14, 2004 (DE) .................. 10 2004 017 950

(51) Int. Cl.
*H02P 6/00* (2006.01)
(52) U.S. Cl. ............... 318/400.08; 318/432; 318/439; 318/466; 318/652
(58) Field of Classification Search ........... 318/139, 318/254, 432, 434, 466, 652, 400.08; 714/55; 73/774; 703/7
See application file for complete search history.

(56) References Cited

U.S. PATENT DOCUMENTS

| | | | |
|---|---|---|---|
| 5,426,776 A | 6/1995 | Erdman | 395/575 |
| 7,239,097 B2 * | 7/2007 | Hashimoto | 318/400.08 |
| 2003/0056583 A1 | 3/2003 | Schodlbauer et al. | 73/200 |
| 2004/0212336 A1 * | 10/2004 | McMillan et al. | 318/439 |
| 2007/0046236 A1 * | 3/2007 | McMillan et al. | 318/466 |
| 2007/0114956 A1 * | 5/2007 | Hashimoto | 318/139 |
| 2007/0209445 A1 * | 9/2007 | Bohr et al. | 73/774 |
| 2007/0262742 A1 * | 11/2007 | Tsuchiya | 318/652 |
| 2008/0111512 A1 * | 5/2008 | Theunissen et al. | 318/466 |
| 2009/0006056 A1 * | 1/2009 | Horner et al. | 703/7 |

FOREIGN PATENT DOCUMENTS

| | | |
|---|---|---|
| DE | 199 62 241 | 7/2001 |
| DE | 202 03 214 | 7/2002 |

* cited by examiner

*Primary Examiner*—Paul Ip
(74) *Attorney, Agent, or Firm*—Darby & Darby

(57) ABSTRACT

A mechanical-electronic position sensor in which the wiper voltage of a potentiometer actuated by a plunger is measured, processed by a microcontroller, and is available as an analog output signal via an output stage. In the event that watchdog signals fail to appear because of a malfunction of the microcontroller, two monitoring stages deactivate the output stage. The monitoring stages themselves are tested by regularly interrupting the watchdog signals for a short time while the output stage is maintained active.

12 Claims, 1 Drawing Sheet

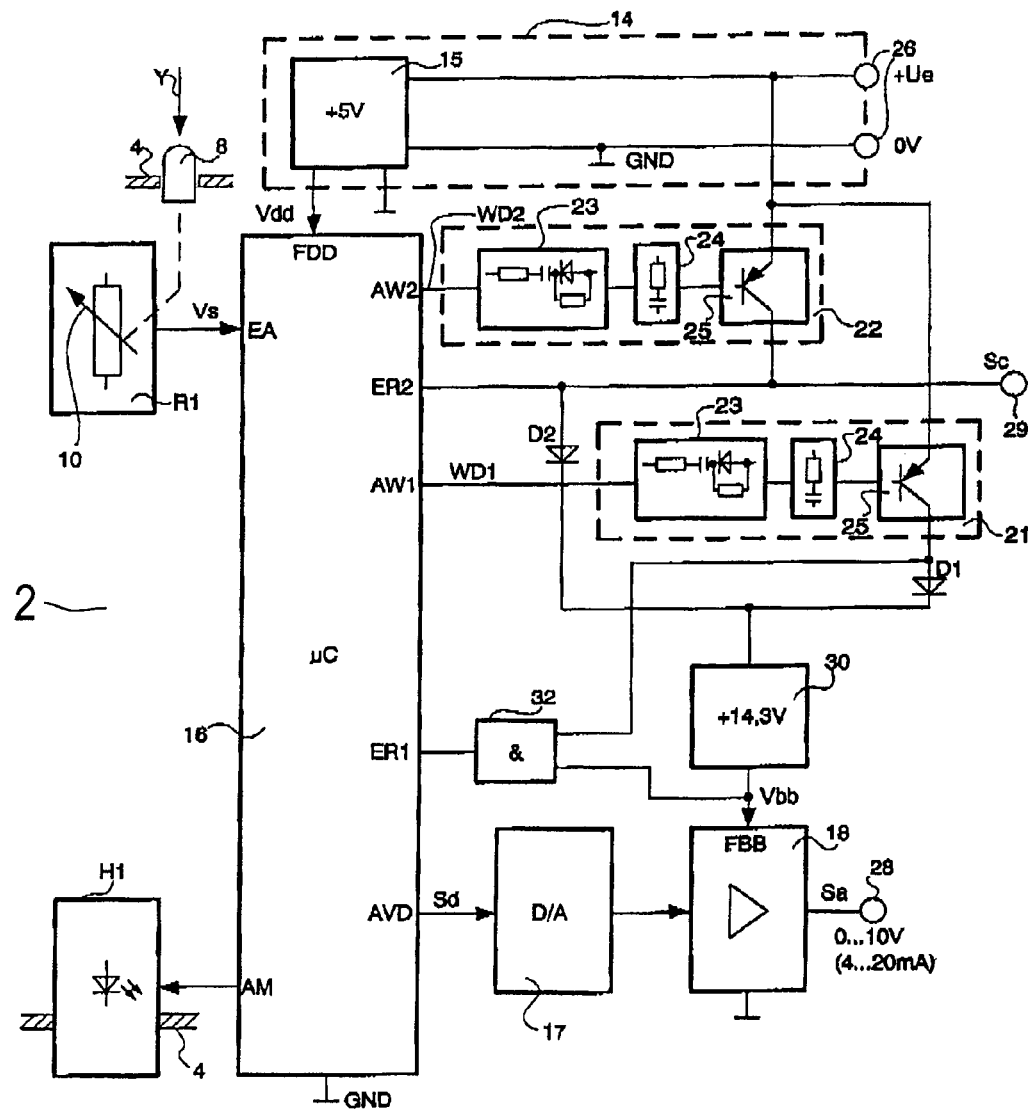

MECHANICAL-ELECTRONIC POSITION SENSOR

The present invention relates to a mechanical-electronic position sensor having a housing, an actuating plunger, a potentiometer acted upon by the actuating plunger, a microcontroller, an output stage, and DC current supply means for supplying at least one supply voltage. A wiper potential that is present at the wiper of the potentiometer and corresponds to the instantaneous position of the actuating plunger is measured by the microcontroller as a digital value.

BACKGROUND

German Patent Application DE 199 62 241 A1 describes a mechanical-electronic position sensor including an angle transducer in the form of a toothed gearing, a magnetic pulse encoder driven by said toothed gearing, an analog-to-digital converter (hereinafter called "A/D converter"), a microprocessor and an output stage having an output signal which may be analog or digital, as desired.

A mechanical-electronic position switch is known from German Utility Model DE 202 03 214 U1. An actuating plunger, a potentiometer, a microcontroller, and electronic switching contacts are disposed in a housing. The actuating plunger is coupled to the wiper of the potentiometer. Upon actuation of the plunger, a varying electrical signal is fed to the microcontroller, said signal causing a change of state of the switching contacts when it exceeds or falls below a programmed threshold value. The switching contacts are connected at their outputs to the connecting terminals. No information is given on how failures of the electronics can be detected to prevent erroneous output signals from leading to maloperations at the periphery of the position switch.

U.S. Pat. No. 5,426,776 A describes a watchdog circuit, which serves to monitor the execution of a program in a microprocessor. The watchdog circuit includes a voltage comparator whose input is connected to a charge storage device formed by a first resistor-capacitor series combination and whose output is connected to a reset input of the micropressor. A charge pump, which includes a second resistor-capacitor series combination and a first semiconductor valve connected to a supply potential, is connected to the charge storage device by a second semiconductor valve. During regular operation, a watchdog output of the microprocessor supplies a dynamically changing watchdog signal to the charge pump, which keeps the charge voltage of the charge storage device below a threshold value by regularly discharging the same. Upon interruption of the microprocessor, the dynamic changing of the watchdog signal, and thus, the discharging of the charge storage device by the charge pump ends, whereupon the charge voltage exceeds the threshold value, causing the comparator to output a reset signal.

SUMMARY OF THE INVENTION

It is, therefore, an object of the present invention to provide a self-monitoring mechanical-electronic position sensor.

The present invention provides a mechanical-electronic position sensor. The position sensor includes:
a housing;
an actuating plunger;
a potentiometer operatively connected the actuating plunger;
an output stage;
a DC current supply device configured to supply at least one supply voltage; and
a microcontroller configured to measure, as a digital value at a data output of the microcontroller, a wiper potential present at a wiper of the potentiometer, the wiper potential corresponding to an instantaneous position of the actuating plunger, the data output being connected via the digital-to-analog converter to the output stage and configured to output an electrical output signal substantially proportional to the wiper potential, the microcontroller including a first watchdog signal output configured to output a dynamically changing periodic first watchdog signal having first interruption intervals applied thereto, the microcontroller including a second watchdog signal output configured to output a dynamically changing periodic second watchdog signal having second interruption intervals applied thereto, the second interruption intervals being offset in time from the first interruption intervals;
a first monitoring stage including a first output and including a first charge storage device capable of being regularly discharged by a first charge pump, the first monitoring stage being connected to the first watchdog signal output, the first monitoring stage being configured to pass the applied supply voltage through to the first output when the dynamically changing periodic first watchdog signal is present, the first output being connected via a first diode to a current supply terminal of the output stage and configured to pass the applied supply voltage through, the first monitoring stage being configured to block the applied supply voltage when the first watchdog signal is interrupted, the first monitoring stage being connected at the first output to a first read-back input of the microcontroller so that in an event that the first monitoring stage fails to block the applied supply voltage during the first interruption interval, the first watchdog signal remains interrupted; and
a second monitoring stage including a second output and including a second charge storage device capable of being regularly discharged by a second charge pump, the second monitoring stage being connected to the second watchdog signal output, the second monitoring stage being configured to pass the applied supply voltage through to the second output when the dynamically changing periodic second watchdog signal is present, the second output being connected via a second diode to the current supply terminal of the output stage and configured to pass the applied supply voltage through, the second monitoring stage being configured to block the applied supply voltage when the second watchdog signal is interrupted, the second monitoring stage being connected at the second output to a second read-back input of the microcontroller so that in an event that the second monitoring stage fails to block the applied supply voltage during the second interruption interval, the second watchdog signal remains interrupted.

The monitoring stages, in conjunction with the watchdog signals, are basically used to monitor the microcontroller for interruption and, in the event of an interruption, to suppress further output of an output signal corresponding to the plunger position by blocking the supply voltage. As a result of the interaction of the monitoring stages with regularly interrupted watchdog signals, the monitoring stages are themselves regularly tested as to whether they are still able to properly respond to an interruption of the watchdog signals. If a test fails and the watchdog signals are permanently interrupted, the further output of an output signal corresponding to the plunger position is suppressed because the outputs of the monitoring stages are looped back to read-back inputs. During failure-free operation of the microcontroller, the parallel monitoring of watchdog signals with offset interruption intervals via the two substantially identical monitoring stages, in conjunction with the two diodes interconnected on one side, ensures continuous current and/or voltage supply to the output stage, thereby providing an uninterrupted output signal.

In an advantageous refinement, a voltage supply stage placed between the diodes and the output stage provides a voltage supply for the output stage, said voltage supply being largely independent of variations in the externally supplied voltage. In this connection, a current-limiting voltage supply stage is advantageous to protect the output stage from overloading at the output. In a further advantageous embodiment, the output of one of the monitoring circuits is looped back in such a manner that it is ANDed with a function query of the voltage supply stage so that the further output of an output signal corresponding to the plunger position is also suppressed in the event of inadequate voltage supply to the output stage, for example, caused by an overload or short-circuit at the output of the output stage.

In one advantageous refinement, a binary control signal is tapped at the output of one of the monitoring circuits, said control signal signaling to the outside whether or not the analog output signal is valid.

In a further advantageous refinement for indicating improper operating states, a message output of the microcontroller is connected to an optical signal element.

Conveniently, the interruption intervals are repeated at intervals of several seconds.

BRIEF DESCRIPTION OF THE DRAWING

Further details and advantages of the present invention will become apparent from the exemplary embodiment described below with reference to a drawing, in which:

The single Figure is a block diagram of a mechanical-electronic position sensor according to the present invention.

DETAILED DESCRIPTION

Mechanical-electronic position sensor 2 is configured in a box-shaped housing 4, which, however, is only indicated in rudimentary form. The mechanical components supported in housing 4 are an actuation plunger 8 which is movable in actuation direction Y with or against the spring force of a compression spring (not shown) as well as a wiper 10 of a potentiometer R1, said wiper being coupled to said actuation plunger. Also disposed in housing 4 are conventional current supply means 14, a microcontroller 16, a D/A converter 17, an output stage 18, a first and a second monitoring stages 21 and 22, a voltage supply stage 30, and an optical signal element H1. The electronic components are mounted on a printed-circuit board, or on two printed-circuit boards connected to each other. A supply voltage Ue is supplied via a pair of first connecting terminals 26 and, on the one hand, is directly used and, on the other hand, is converted by a voltage regulator 15 to a first supply potential Vdd of +5 V for a current supply terminal FDD of microcontroller 16. Supply voltage Ue and first supply potential Vdd are referred to the reference potential GND (ground potential). Supply voltage Ue is supplied to output stage 18 via monitoring stages 21, 22. To increase the possible uses of position sensor 2, replaceable drive heads may be placed in front of actuating plunger 8.

The position of actuating plunger 8 is transferred to wiper 10 of potentiometer R1. Depending on the position of actuating plunger 8, a different wiper potential Vs is present at wiper 10. Wiper potential Vs, which is referred to reference potential GND, is supplied to an analog input EA of microcontroller 16, converted by said microcontroller to a corresponding digital value and transferred as a digital quantity Sd to D/A converter 17 via a data output ADV. D/A converter 17 transfers the resulting analog value to output stage 18 whose output makes a corresponding analog value of an output signal Sa available for external use via a second connecting terminal 28. Output stage 18 is designed, for example, as a controllable voltage source having an output signal Sa in the range from 0 V to 10 V, or as a controllable current source having an output signal ranging from 4 mA to 20 mA. The overall range of analog signal Sa corresponds to the available actuator travel of actuating plunger 8. Under certain operating conditions, microcontroller 16 emits different signals to signal element H1 via a message output AM in order to indicate errors and certain states by lighting up or blinking.

During proper operation, microcontroller 16 emits a fist watchdog signal WD1 via a first watchdog signal output AW1, and a second watchdog signal WD2 via a second watchdog signal output AW2. Watchdog signals WD1, WD2 change dynamically between a low level and a high level at a frequency of about 5 kHz. First watchdog signals WD1 are fed to first monitoring stage 21, and second watchdog signals WD2 are fed to second monitoring stage 22. First monitoring stage 21 and second monitoring stage 22 each have a charge pump 23 on the input side, a transistor switch 25 on the output side, and a charge storage device 24 placed therebetween. The charge pumps and the charge storage devices are shown only functionally here, and are known per se from U.S. Pat. No. 5,426,776 A mentioned at the outset. Instead of the semiconductor valves indicated, charge pumps 23 can also be equipped with transistors in a technically appropriate manner. The switching paths of transistor switches 25 are connected, on one side, to supply voltage Ue and, on the other side, to a first diode D1 in the case of first monitoring stage 21, and to a second diode D2 in the case of second monitoring stage 22. The interconnected cathodes of diodes D1, D2 are connected to the input of voltage supply stage 30 to supply, via the output thereof, a second supply voltage Vbb to a current supply terminal FBB of output stage 18, said second supply voltage having a value of, for example, +14.3 V with respect to reference potential GND. First monitoring stage 21 and voltage supply stage 30 are connected at their outputs to the inputs of an AND gate 32, which is connected at its output to a first read-back, or feedback, input ER1 of microcontroller 16. Second monitoring stage 22 is connected at its output directly to a second read-back input ER2 of microcontroller 16 and, in addition, to a third connecting terminal 29 for outputting a binary control signal Sc.

During proper operation, microcontroller 16 emits watchdog signals WD1 and WD2 at its watchdog signal outputs AW1 and AW2. Charge pumps 23 constantly pump charge out of charge storage devices 24 with the rhythm of the dynamically changing watchdog signals WD1 and WD2. Thus, the charge voltage of charge storage devices 24 remains below a threshold value at which transistor switches 25 are still conductive and therefore pass supply voltage Ue to voltage supply stage 30 via the two monitoring stages 21, 22 and the associated diodes D1, D2. Due to second supply potential Vbb provided, output stage 18 is in the active state. Thus, under conditions listed further below, second connecting terminal 28 provides a valid output signal Sa which corresponds to the instantaneous wiper potential Vs.

In the event of an interruption of microcontroller 16, or in case the program stored in microcontroller 16 crashes, the output of watchdog signals WD1 and WD2 ends. After that, charge pumps 23 can no longer pump charge out of charge storage devices 24, so that their charge voltage exceeds the threshold value mentioned earlier. When the threshold value is exceeded, transistor switches 25 go to the non-conducting state. Thus, both monitoring stages 21, 22 disconnect supply voltage Ue from supply voltage stage 30. Control signal Sc outputs an alarm to the outside by the stationary transition to the low level near reference potential GND. The absence of second supply voltage Vbb then deactivates output stage 18. However, this safety function is available only under the condition that monitoring stages 21, 22 themselves are functional.

In order to check monitoring stages 21 and 22 themselves for their function of deactivating output stage 18 in response to an absence of watchdog signals WD1 and WD2, said watchdog signals WD1 and WD2 are interrupted at periodical intervals of about 5 s. First interruption intervals $\Delta t1$ belonging to first watchdog signal WD1 are offset, for example, by about 0.5 s, from second interruption intervals $\Delta t2$ belonging to second watchdog signal WD2.

Once a first interruption interval $\Delta t1$ starts, the pumping of charge out of charge storage device 24 of first monitoring stage 21 ends, after which the transistor switch 25 thereof goes to the non-conducting state in the course of several milliseconds.

The potential that has been present at the anode of first diode D1 with the magnitude of supply voltage Ue breaks down. In the meantime, however, supply voltage Ue is supplied to voltage supply stage 30 via the still conductive transistor switch 25 of second monitoring stage 22 and via second diode D2, so that output signal Sa is not interrupted. Thus, the input of AND gate 32 connected to voltage supply stage 30 remains at the high level with the value of second supply potential Vbb, while at the input connected to first diode D1, and thus, also at the output of AND gate 32, changes from the high level to the low level. This change in potential is detected by microcontroller 16 via its first read-back input ER1 as a successful test of first monitoring stage 21 and then, after about 100 µs, the microcontroller terminates first interruption interval $\Delta t1$ by resuming the output of the dynamically changing first watchdog signal WD1 via first watchdog signal output AW1 to first monitoring stage 21, whereupon this monitoring stage passes supply voltage Ue through again.

Similarly, once a second interruption interval $\Delta t2$ starts, the pumping of charge out of charge storage device 24 of second monitoring stage 22 ends, after which the transistor switch 25 thereof goes to the non-conducting state in the course of several milliseconds. The potential that has been present at the anode of second diode D2 with the magnitude of supply voltage Ue breaks down. In the meantime, however, supply voltage Ue is supplied to voltage supply stage 30 via the still conductive transistor switch 25 of first monitoring stage 21 and via first diode D1, so that output signal Sa is not interrupted. The change in potential from high to low at second diode D2 is detected by microcontroller 16 via its second read-back input ER2 as a successful test of second monitoring stage 22 and then, after about 100 µs, the microcontroller terminates second interruption interval $\Delta t2$ by resuming the output of the dynamically changing second watchdog signal WD2 via second watchdog signal output AW2 to second monitoring stage 22, whereupon this monitoring stage passes supply voltage Ue through again.

If, in the event of a failure, for example caused by breakage of a conductor connection, a component failure, or a significant decrease in capacitance of charge storage device 24, monitoring stage 21 or 22 should not respond to interruption interval $\Delta t1$ or $\Delta t2$, then no corresponding change in potential is detected at read-back input ER1 or ER2. On the one hand, the interruption interval $\Delta t1$ or $\Delta t2$ that has started is not terminated and, after a waiting time of, for example, 10 ms, microcontroller 16 outputs a digital zero for digital quantity Sd and falls into an error loop, from which it can only exit when the failure is removed. At the same time, an error message signal is sent by microcontroller 16 via its message output AM to signal element H1 in order to blink an LED in a warning color. In the event of a fault, watchdog signals WD1, WD2 are no longer output as dynamically changing signals. For the absence of the changing behavior of second watchdog signal WD2 alone, control signal Sc changes from a high-level potential near the positive supply voltage Ue to a low-level potential near reference potential GND. This change in potential may be interpreted as an error message, for example, by an external control system connected to third connecting terminal 29.

Voltage supply stage 30 has current-limiting properties, so that in the event of an overload of output stage 18, especially because of a short-circuit at second connecting terminal 28, second supply voltage Vbb breaks down. Microcontroller 16 detects this event via AND gate 32 at first read-back input ER1 and then blocks the monitoring stages 21 and 22 by terminating the watchdog signals WD1 and WD2, thereby switching off control signal Sc and deactivating output stage 18.

What is claimed is:

1. A mechanical-electronic position sensor comprising:
   a housing;
   an actuating plunger;
   a potentiometer operatively connected the actuating plunger;
   an output stage;
   a DC current supply device configured to supply at least one supply voltage; and
   a digital-to-analog converter;
   a microcontroller configured to measure, as a digital value at a data output of the microcontroller, a wiper potential present at a wiper of the potentiometer, the wiper potential corresponding to an instantaneous position of the actuating plunger, the data output being connected via the digital-to-analog converter to the output stage and configured to output an electrical output signal substantially proportional to the wiper potential, the microcontroller including a first watchdog signal output configured to output a dynamically changing periodic first watchdog signal having first interruption intervals applied thereto, the microcontroller including a second watchdog signal output configured to output a dynamically changing periodic second watchdog signal having second interruption intervals applied thereto, the second interruption intervals being offset in time from the first interruption intervals;
   a first monitoring stage including a first output and including a first charge storage device capable of being regularly discharged by a first charge pump, the first monitoring stage being connected to the first watchdog signal output, the first monitoring stage being configured to pass the applied supply voltage through to the first output when the dynamically changing periodic first watchdog signal is present, the first output being connected via a first diode to a current supply terminal of the output stage and configured to pass the applied supply voltage through, the first monitoring stage being configured to block the applied supply voltage when the first watchdog signal is interrupted, the first monitoring stage being connected at the first output to a first read-back input of the microcontroller so that in an event that the first monitoring stage fails to block the applied supply voltage during the first interruption interval, the first watchdog signal remains interrupted; and a second monitoring stage including a second output and including a second charge storage device capable of being regularly discharged by a second charge pump, the second monitoring stage being connected to the second watchdog signal output, the second monitoring stage being configured to pass the applied supply voltage through to the second output when the dynamically changing periodic second watchdog signal is present, the second output being connected via a second diode to the current supply terminal of the output stage and configured to pass the applied supply voltage through, the second monitoring stage being configured to block the applied supply voltage when the second watchdog signal is interrupted, the second monitoring stage being connected at the second output to a second read-back input of the microcontroller so that in an event that the second monitoring stage fails to block the applied supply voltage during the second interruption interval, the second watchdog signal remains interrupted.

2. The position sensor as recited in claim 1 wherein the first output is connected indirectly to the current supply terminal of the output stage.

3. The position sensor as recited in claim 1 wherein the second output is connected indirectly to the current supply terminal of the output stage.

4. The position sensor as recited in claim 1 wherein the first output is connected at the first output indirectly to the first read-back input.

5. The position sensor as recited in claim 1 wherein the second output is connected at the second output indirectly to the second read-back input.

6. The position sensor as recited in claim 1 wherein the second monitoring stage is connected at the second output to a control connecting terminal.

7. The position sensor as recited in claim 1 further comprising a voltage supply stage connected between a junction point of the first and second diodes and the current supply terminal of the output stage.

8. The position sensor as recited in claim 7 wherein the voltage supply stage is a current-limiting voltage supply stage.

9. The position sensor as recited in claim 7 wherein the first monitoring stage and the voltage supply stage are connected to the first read-back input via an AND gate, and the second monitoring stage is connected directly to the second read-back input.

10. The position sensor as recited in claim 8 wherein the first monitoring stage and the voltage supply stage are connected to the first read-back input via an AND gate, and the second monitoring stage is connected directly to the second read-back input.

11. The position sensor as recited in claim 1 wherein the microcontroller includes a message output connected to an optical signal element.

12. The position sensor as recited in claim 1 wherein the first and second interruption intervals have a repetition interval in a single-digit second range.

* * * * *